(12) United States Patent
Moon et al.

(10) Patent No.: US 7,250,604 B2
(45) Date of Patent: Jul. 31, 2007

(54) OXIDE THIN FILM FOR BOLOMETER AND INFRARED DETECTOR USING THE OXIDE THIN FILM

(75) Inventors: Sung Moon, Namnyangju-Shi (KR); Hyun-Joon Shin, Seoul (KR); Yong-Hee Han, Seoul (KR)

(73) Assignee: Korea Institute of Science and Technology, Daejon (KR)

( * ) Notice: Subject to any disclaimer, the term of this patent is extended or adjusted under 35 U.S.C. 154(b) by 208 days.

(21) Appl. No.: 10/953,700

(22) Filed: Sep. 29, 2004

(65) Prior Publication Data

US 2005/0167592 A1   Aug. 4, 2005

(30) Foreign Application Priority Data

Jan. 29, 2004   (KR) ........................ 10-2004-005559

(51) Int. Cl.
*G01J 5/00* (2006.01)
(52) U.S. Cl. .................................. 250/338.1
(58) Field of Classification Search ............. 250/338.1, 250/338.4
See application file for complete search history.

(56) References Cited

U.S. PATENT DOCUMENTS 5,801,383 A * 9/1998 Wada et al. ................. 250/332
6,489,613 B1 12/2002 Mori et al.
6,512,229 B2 * 1/2003 Sasaki ..................... 250/338.1

OTHER PUBLICATIONS

Jin et al. "Growth abd characterization of epitaxial films of tungsten-doped vanadium oxides on sapphire (110) by reactive magnetron sputtering", J.Vac.Sci.Technol.A 17(4), Jul./Aug. 1999.*
Soltani et al. "Effects of Ti-W codoping on the optical and electrical switching of vanadium dioxide thin films grown by a reactive pulsed laser deposition", Applied Physics Letters, vol. 85, No. 11, pp. 1958-1960, 2004.*
Soltani et al. "Optical switching of vanadium dioxide thin films deposited by reactive pulsed laser deposition", Journal of Vacuum Science & Technology A: Vacuum, Surfaces, and Films, vol. 22, No. 3, pp. 859-864, May 2004.*
Sung Moon "Novel Infrared Absorbing Material Coupled Uncooled Microbolometer", IEEE, 2004.*

* cited by examiner

*Primary Examiner*—Constantine Hannaher
(74) *Attorney, Agent, or Firm*—Harness, Dickey & Pierce, PLC

(57) ABSTRACT

The present invention relates to an oxide thin film for a bolometer-type uncooled infrared detector having high sensitivity. An amorphous vanadium tungsten oxide (V—W—$O_x$), i.e. a tungsten-doped vanadium oxide, is provided as an oxide film for a bolometer application. An oxide for bolometer having characteristics of low resistance of 5 to 200 k$\Omega$ and variable TCR between −1.5 and −4.1%/° C. can be obtained by an oxidation of vanadium-tungsten metal film at a low temperature around 300° C., with changing a tungsten content and oxidation time. And a reproducible thin film can be fabricated by low price equipment for thin film deposition, without expensive ion beam or laser apparatus. Accordingly, an oxide for bolometer having characteristics of resistance lower than 100 k$\Omega$ and TCR higher than −3%/° C. can be obtained with reproducibility, whereby an uncooled-type infrared detector having high sensitivity can be fabricated.

12 Claims, 3 Drawing Sheets

OXIDE THIN FILM FOR BOLOMETER AND INFRARED DETECTOR USING THE OXIDE THIN FILM

BACKGROUND OF THE INVENTION

1. Field of the Invention

The present invention relates to an oxide thin film for a bolometer. More specially, it relates to an oxide thin film for bolometer-type uncooled infrared detector having high sensitivity.

2. Description of the Related Art

Bolometer, as a kind of infrared detector, can detect infrared through measuring changes in electrical resistance caused by the temperature increase, which is occurred by absorbing the infrared radiated from an object and converting it to a thermal energy. Accordingly, an infrared image can be realized by making a 2-dimensional focal plane array of the bolometer having such characteristics.

The characteristics required for a bolometer material are a high TCR (temperature coefficient of resistance), a low device resistance, a compatibility with a IC process, a low cost and simplification in manufacturing process, a high reliability and so on.

The bolometer materials recently used are metal thin films such as Ti, a vanadium oxide, an amorphous silicon, etc. The use of metal films causes a merit of low resistance at room temperature and a demerit of a very low TCR, which requires an improvement of device responsibility. In case of amorphous silicon, the property of responsibility is pretty good because of a high TCR value, but a Johnson noise increases with an increased device resistance.

And vanadium oxide has relatively higher TCR values around −2.0%/° C. than metal film and relatively lower device resistance below 100 kΩ than amorphous silicon. Besides, vanadium oxide has problems that it is difficult to fabricate thin films with high reproducibility due to the existence of various metastable phases, accordingly the preparation of vanadium oxide films requires expensive apparatuses such ion beam and laser equipment, or high process temperature over 400° C.

In order to solve the problems of high resistance of vanadium oxide for application to bolometer device, U.S. Pat. No. 5,288,380 discloses a method for reducing the resistance of vanadium oxide by doping other metals such as tungsten, chrome, manganese into vanadium oxide.

Although this prior art is invented to reduce the resistance of vanadium oxide by doping, it just very roughly gives a description on doping effect without providing specific doping composition etc., and does not reveal an improvement of TCR value and the performance of a infrared detector caused by doping. And this prior art suggests co-sputtering in an oxygen atmosphere as a method for doping other metals such as tungsten into a vanadium oxide. Since the characteristics of a vanadium oxide are strongly dependent on an oxygen partial pressure due to existence of various metastable phases, an oxygen partial pressure has to be precisely controlled in such method for reactively producing a vanadium oxide in an oxygen atmosphere. Accordingly it is very difficult to produce a reproducible vanadium oxide thin film and control the characteristics of the vanadium oxide film.

U.S. Pat. No. 6,489,613 (Dec. 3, 2002) discloses a method for producing an oxide thin film having a high TCR and a relative low resistance value through substituting a vanadium of vanadium oxide with other metal ion (Cr, Al, Fe, Mn, Nb, Ta, Ti) by sol-gel method and a heat treatment at the temperature of 400° C. to 450° C. However, this technique has the drawbacks in viewpoint of process that the heat treatment temperature is relatively high over 400° C., and a long-term heat treatment is required including successive anneals in oxidation and reduction atmospheres after deposition of oxide thin film. Furthermore, if an oxide thin film is deposited by a sputtering method, not a sol-gel technique, the problem in reproducibility can be easily occurred due to the difficult of controlling oxygen content.

SUMMARY OF THE INVENTION

It is an object of the present invention to improve the performance of bolometer device through providing a bolometer material having a low device resistance and a high TCR value.

It is a further object of the present invention to provide an infrared detector with a high sensitivity.

In fulfillment of the objectives described above, an oxide thin film for a bolometer according to the present invention comprises an amorphous vanadium tungsten oxide, represented by V—W—Ox, wherein x satisfies $0.5 \leq x \leq 2$.

And the present invention provides an infrared detector comprising a bolometer, wherein the bolometer comprises an amorphous vanadium tungsten oxide, represented by V—W—$O_x$, wherein x satisfies $0.5 \leq x \leq 2$.

BRIEF DESCRIPTION OF THE DRAWINGS

The objects, features and advantages of the present invention will become more apparent from consideration of the following detailed description taken in conjunction with the accompanying drawings, wherein.

DETAILED DESCRIPTION OF THE EMBODIMENTS

Hereinafter, the exemplary embodiments of the present invention are described in detail with reference to the attached drawings.

An oxide for a bolometer, a tungsten-doped vanadium oxide, i.e. a vanadium tungsten oxide (V—W—$O_x$), can be used as an infrared sensing material in an uncooled infrared detector and has lower device resistance and higher TCR at the room temperature than a conventional a vanadium oxide. The contents of tungsten and oxygen in the V—W—$O_x$ thin film can be variously changed, whereby the resistance and TCR can be controlled according to the contents. The V—W—$O_x$ thin film is fabricated by a deposition of V—W (vanadium-tungsten) metal film and a low temperature oxidation of the pre-deposited V—W film.

According to the present invention, V—W—$O_x$, thin film has the content of tungsten (W) to vanadium (V) variable in the range of 1 to 50 at % and the oxygen content in the range of $0.5 \leq x \leq 2$. The structure of thin film is amorphous. Generally the thin film prepared by a low temperature process below 350° C. shows amorphous characteristics.

Although a thickness of V—W—$O_x$ thin film can vary between 25 and 200 nm for a bolometer application, the thickness less than 100 nm is preferred in consideration of thermal mass.

If oxygen content, i.e. x, exceeds 2, the thin film cannot be applicable for a bolometer device due to highly increased resistance. The thin film of x below 0.5 has a very low resistance at the room temperature, but shows very unstable characteristics of resistance variation with temperature, accordingly it cannot be suitable for a bolometer device. Generally, the tendency of increase of room temperature resistance and TCR is shown as oxygen content increases at the specific tungsten content.

Figure 1:
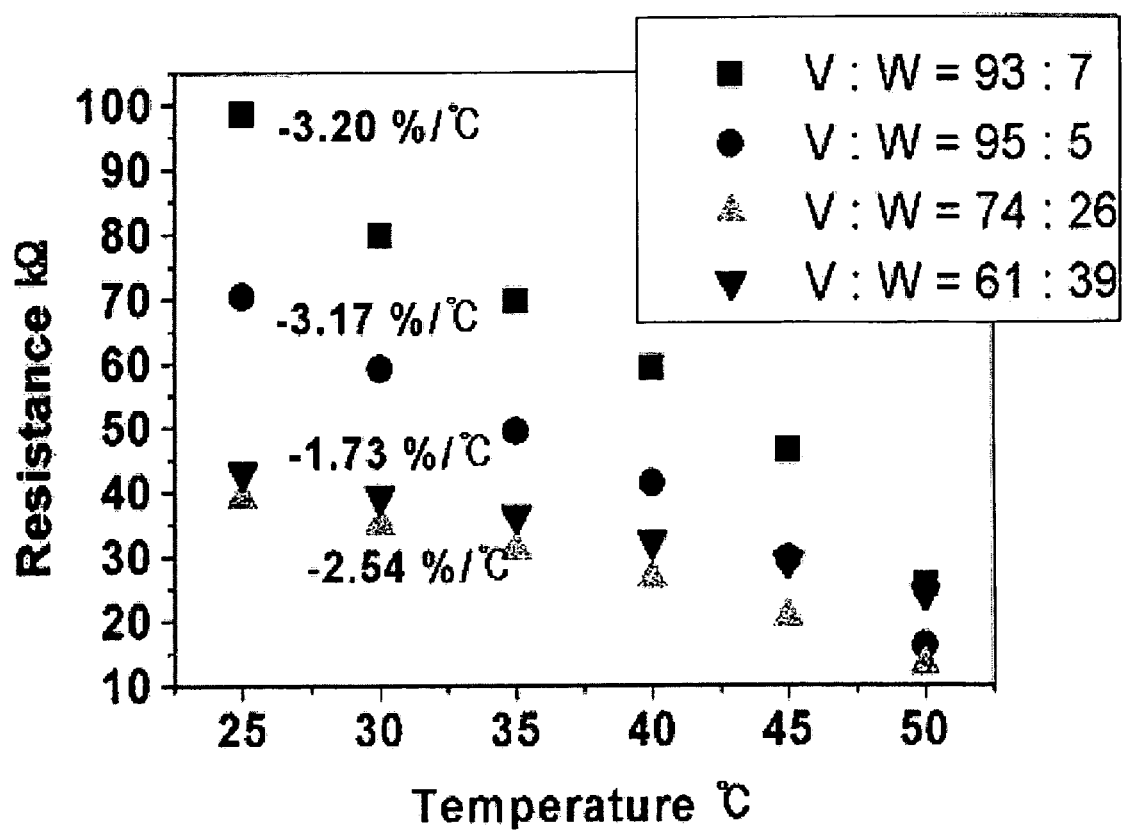
FIG. 1 is a graph showing variation characteristics of resistance and TCR as a function of contents of vanadium and tungsten.

FIG. 1 is a graph showing variation characteristics of resistance and TCR as a function of contents of vanadium and tungsten. As shown in FIG. 1, resistance lower than 100 kΩ and TCR value higher than −3.0%/° C. can be obtained at the tungsten content of 1 and 10 at %.

A method for preparing the V—W—$O_x$ thin film according to the present invention comprises a deposition process of vanadium-tungsten metal film on a substrate and a low temperature oxidation process of the deposited vanadium-tungsten metal film.

Primarily, a deposition process of vanadium-tungsten metal film is described in the followings.

In a prior art, ion beam sputter or PLD (pulsed laser deposition) method equipped with expensive ion beam or laser apparatus is required to overcome the problem in reproducibility caused by the existence of various metastable phases and difficulty in oxygen content control during deposition of a vanadium oxide.

However, the present invention does not use a direct deposition of oxide film with an expensive apparatuses in order to overcome such problem in reproducibility, but provides a method for fabricating an oxide through depositing a vanadium tungsten metal film, which is a simple process and does not make any reproduction problems, and then oxidizing the metal film at low temperature into an oxide. A vanadium tungsten metal thin film can be easily fabricated by a conventional r.f. sputtering, and even by conventional other different equipment for thin film deposition such as sol-gel technique, CVD (chemical vapor deposition), PLD (pulsed laser deposition), evaporator and so on.

Figure 2:
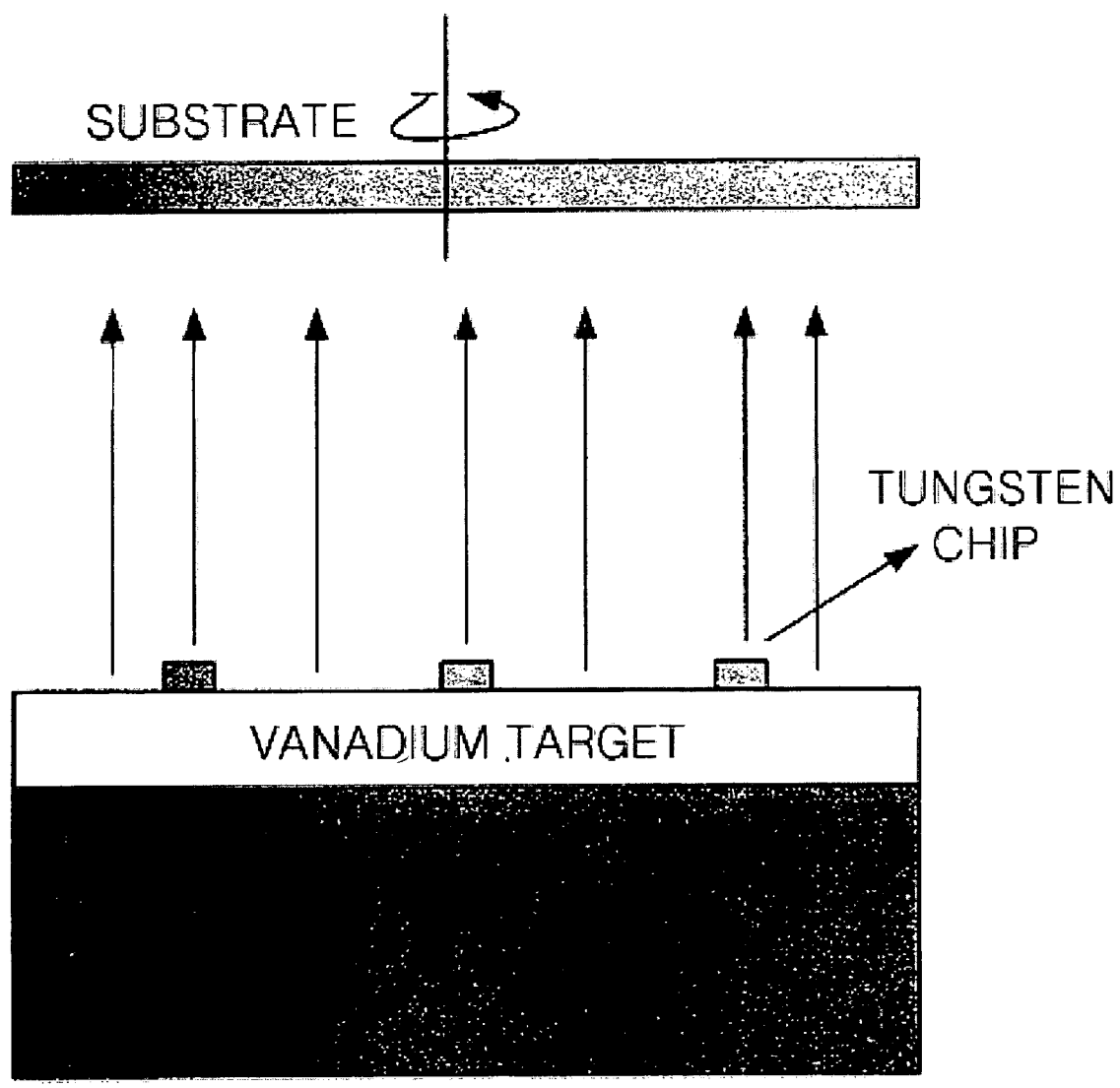
FIG. 2 is a schematic diagram showing a method for controlling tungsten content with the number of tungsten chips during r.f. sputtering process.

A vanadium-tungsten film is deposited through r.f. sputtering method, using Ar gas as a plasma gas, at the working pressure of 0.5 to 10 mTorr and the plasma power of 150 to 350 W. Here, there are three methods to control the compositional ratio of vanadium and tungsten, i.e. sputtering with an alloy target of tungsten-doped vanadium having the predetermined composition, co-sputtering with the respective targets of vanadium and tungsten, and sputtering with target geometry of tungsten chips fixed on a vanadium target as shown in FIG. 2. In the third method, the compositional ratio can be controlled through changing the number of tungsten chips.

Next, a vanadium-tungsten metal film pre-deposited through the foregoing method undergoes an oxidation process by heat treatment.

In a prior art, deposition of oxide film for a bolometer using only vanadium essentially requires a long-term heat treatment at high temperature more than 400° C.

However, the present invention can reduce the process time for oxidation and heat treatment temperature below 400° C., because an oxidation can be very easily performed even at a low temperature as tungsten content doped into vanadium increases. That is, a bolometer with a high quality can be fabricated by a low temperature oxidation through a simple method of doping tungsten into vanadium, according to the present invention.

Heat treatment of the vanadium-tungsten metal film is performed at a low temperature around 300° C., at a constant oxygen partial pressure, and for a process time dependent on the tungsten content and film thickness. Here, a heat treatment temperature can vary in the range of 250° C. to 450° C., and an oxygen partial pressure can be also changeable.

Figure 3:
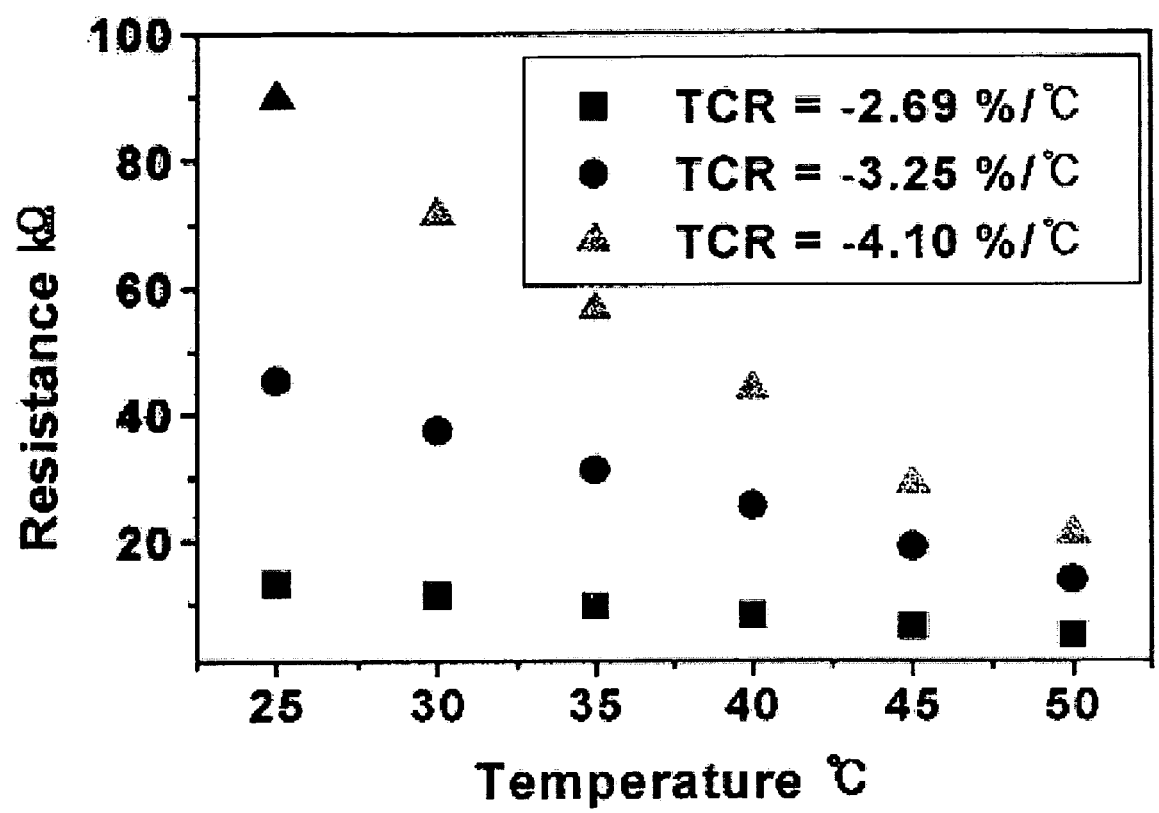
FIG. 3 is a graph showing variation characteristics of resistance and TCR according to heat treatment time at the tungsten content of 5 at %.

FIG. 3 is a graph showing variation characteristics of resistance and TCR according to heat treatment time at the tungsten content of 5 at %. As a heat treatment time increases, oxygen content increases, whereby a room temperature resistance and TCR accordingly increase.

A low temperature oxidation method of the present invention can provide an oxide for bolometer having excellent characteristics of resistance lower than 100 kΩ and TCR higher than −4%/° C. through controlling an oxidation time (heat treatment time) according to the film thickness, in the tungsten content range of 1 to 10 at %.

According to the present invention, an oxide for bolometer having excellent characteristics of resistance lower than 100 kΩ and TCR higher than −4%/° C. can be obtained, and a device performance can be improved through application of such oxide material to bolometer device manufacturing.

And, a low temperature oxidation method, oxidizing the pre-deposited metal film at a low temperature, can solve the problem in reproducibility caused by a lot of metastable phases and difficulty in oxygen content control.

Moreover, low price equipment for thin film deposition can be used and a heat treatment time can be reduced by tungsten doping, whereby cost for fabrication is down and a fabrication process is simplified.

Although the present invention has been described in terms of the presently preferred embodiment, it is to be understood that the disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

The entire content of Priority document No. 10-2004-0005559 is incorporated herein by reference.

What is claimed is:

1. An oxide thin film for a bolometer comprising,
   an amorphous vanadium tungsten oxide showing no phase transition and high TCR property, represented by V—W—Ox, wherein x satisfies $0.5 \leq x \leq 2$.

2. The oxide thin film for a bolometer according to claim 1, wherein the content of said tungsten (W) to vanadium (V) is in the range of 1 to 50 atomic percent (at %).

3. An infrared detector comprising.
   a bolometer,
   wherein said bolometer comprises a vanadium tungsten oxide, represented by V—W—$O_x$, wherein x satisfies $0.5 \leq x \leq 2$.

4. The infrared detector according to claim 3, wherein the content of said tungsten (W) to vanadium (V) varies within the range of 1 to 50 at %.

5. The infrared detector according to claim 3, wherein a thickness of said vanadium tungsten oxide is in the range of 25 nm to 200 nm.

6. A method for fabricating an amorphous vanadium tungsten oxide (V—W—$O_x$) thin film comprising,
   a deposition process of vanadium-tungsten metal alloy thin film on a substrate; and
   a low temperature oxidation process of said vanadium-tungsten thin film deposited.

7. The method for fabricating a vanadium tungsten oxide (V—W—$O_x$) thin film according to claim 6, wherein said deposition process of vanadium-tungsten thin film is performed through a r.f. sputtering.

8. The method for fabricating a vanadium tungsten oxide (V—W—$O_x$) thin film according to claim 7, wherein said r.f. sputtering is performed with Ar gas as a plasma gas, at the working pressure of 0.5 to 10 mTorr and the plasma power of 150 to 350 W.

9. The method for fabricating a vanadium tungsten oxide (V—W—$O_x$) thin film according to claim 8, wherein said deposition process of vanadium-tungsten thin film performed through a r.f. sputtering comprises the step of controlling a compositional ratio of vanadium and tungsten,
wherein said step of controlling a compositional ratio of vanadium and tungsten is executed through one method of:
a) sputtering with an alloy target of tungsten-doped vanadium having a predetermined composition,
b) simultaneously co-sputtering with respective targets of vanadium and tungsten, and
c) sputtering with target geometry having tungsten chips fixed on a vanadium target, where in the compositional ratio is controlled by changing the number of tungsten chips.

10. The method for fabricating a vanadium tungsten oxide (V—W—$O_x$) thin film according to claim 6, wherein said deposition process of vanadium-tungsten thin film is performed through one of a sol-gel technique, a CVD method, a PLD method and an evaporation.

11. The method for fabricating a vanadium tungsten oxide (V—W—$O_x$) thin film according to claim 6, wherein said low temperature oxidation process of said vanadium-tungsten metal thin film comprises a low temperature heat treatment,
wherein said heat treatment is performed at a low temperature 250 to 400° C. and a predetermined oxygen partial pressure, for a process time controlled depending on the tungsten content and film thickness.

12. The method for fabricating a vanadium tungsten oxide (V—W—Ox) thin film according to claim 11, wherein an oxide for bolometer having characteristics of resistance lower than 100 KΩ and TCE higher than −4%/° C. is obtained through controlling a heat treatment time depending on a film thickness, in the tungsten content range of 1 to 10 at %.

* * * * *